United States Patent
Wang et al.

(10) Patent No.: US 8,200,474 B2
(45) Date of Patent: Jun. 12, 2012

(54) DYNAMIC MODEL CHECKING WITH PROPERTY DRIVEN PRUNING TO DETECT RACE CONDITIONS

(75) Inventors: Chao Wang, Plainsboro, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 588 days.

(21) Appl. No.: 12/397,696

(22) Filed: Mar. 4, 2009

(65) Prior Publication Data

US 2009/0282288 A1     Nov. 12, 2009

Related U.S. Application Data

(60) Provisional application No. 61/051,545, filed on May 8, 2008.

(51) Int. Cl.
*G06F 9/45* (2006.01)
(52) U.S. Cl. ........................................................ 703/22
(58) Field of Classification Search .................... 703/22
See application file for complete search history.

(56) References Cited

OTHER PUBLICATIONS

Yi et al.; Stateful Dynamic Partial-Order Reduction; Z. Liu and J. He (Eds.): ICFEM 2006, LNCS 4260, pp. 149-167, 2006.*
Wang et al.; Dynamic Model Checking with Property Driven Pruning to Detect Race Conditions; pp. 1-15; ATVA, Oct. 2008.*
Flanagan et al., Dynamic Partial-Order Reduction for Model Checking Software; POPL'05, Jan. 12-14, 2005,; pp. 1-12.*

* cited by examiner

*Primary Examiner* — Hugh Jones
(74) *Attorney, Agent, or Firm* — James Bitetta; Bao Tran; Joseph Kolodka

(57) ABSTRACT

A system and method for dynamic data race detection for concurrent systems includes computing lockset information using a processor for different components of a concurrent system. A controlled execution of the system is performed where the controlled execution explores different interleavings of the concurrent components. The lockset information is used during the controlled execution to check whether a search subspace associated with a state in the execution is free of data races. A race-free search subspace is dynamically pruned to reduce resource usage.

24 Claims, 7 Drawing Sheets

```
1: Initially: s_k.lksetSet(x) = {∅} for all state s_k and global variable x;

2: UpdateLocksets(s_{k-1}, t_k, s_k) {
3:    if (t_k is lock(fl))
4:       for each (lkset ∈ s_{k-1}.lksetSet(x))
5:          s_k.lksetSet(x) ← {lkset ∪ {fl}} ∪ s_k.lksetSet(x);
6:    else if (t_k is unlock(fl))
7:       for each (lkset ∈ s_{k-1}.lksetSet(x))
8:          s_k.lksetSet(x) ← {lkset \ {fl}} ∪ s_k.lksetSet(x);
9:    else if (t_k is branch end) {
10:      let t_j be the branch begin that matches t_k;
11:      let L(x) be the set of locksets recorded for x in the other branch;
12:      for each (global variable x)
13:         s_k.lksetSet(x) ← L(x) ∪ s_{k-1}.lksetSet(x);
14:    }
15: }

16: SubspaceRaceFree(s_1) {
17:    let s_1 →^{t_1} s_1 ... →^{t_n} s_n be the transition sequence such that s_n.enabled = ∅;
18:    i ← 1;
19:    while (i < n){
20:       j ← i + 1;
21:       while (j < n){
22:          for each (global variable x) {
23:             let set_1 ∈ s_i.lksetSet(x), set_2 ∈ s_j.lksetSet(x);
24:             if (∃set_1, set_2 such that set_1 ∩ set_2 = ∅) return FALSE;
25:          }
26:          j ← j + 1;
27:       }
28:       i ← i + 1;
29:    }
30:    return TRUE;
31: }
```

...
a₁     lock(f1) ;
a₂     x++;
a₃     unlock(f1) ;
a₄     ...
a₅     lock(f2) ;
a₆     y++;
a₇     unlock(f2) ;
a₈     ...
a₉     lock(f1) ;
a₁₀    z++;
a₁₁    unlock(f1) ;
```

```
T₂

...
b₁     lock(f1) ;
b₂     lock(f2) ;
b₃     z++;
b₄     c = x;
b₅     unlock(f2) ;
b₆     unlock(f1) ;
b₇     ...
b₈     lock(f1) ;
b₉     if (c==0)
b₁₀       y++;
b₁₁    unlock(f1) ;
```

1: Initially: $S$ is empty; DPORSEARCH($S, s_0$)

2: DPORSEARCH($S, s$) {
3:     if (DETECTRACE($s$)) exit ($S$);
4:     $S$.push($s$);
5:     for each $t \in s.enabled$, DPORUPDATEBACKTRACKSETS($S, t$);
6:     let $\tau \in Tid$ such that $\exists t \in s.enabled : tid(t) = \tau$;
7:     $s.backtrack \leftarrow \{\tau\}$;
8:     $s.done \leftarrow \varnothing$;
9:     while ($\exists t \in s.backtrack \setminus s.done$) {
10:         $s.done \leftarrow s.done \cup \{t\}$;
11:         $s.backtrack \leftarrow s.backtrack \setminus \{t\}$;
12:         let $s' \in S$ such that $s \xrightarrow{t} s'$;
13:         DPORSEARCH($S, s'$);
14:         $S$.pop($s$);
15:     }
16: }

17: DPORUPDATEBACKTRACKSETS($S, t$) {
18:     let $T$ be the sequence of transitions associated with $S$;
19:     let $t_d$ be the latest transition in $T$ that is dependent and may be co-enabled with $t$;
20:     if ($t_d \neq null$){
21:         let $s_d$ be the state in $S$ from which $t_d$ is executed;
22:         let $E$ be $\{q \in s_d.enabled \mid tid(q) = tid(t)$, or $q$ in $T$, $q$ was after $t_d$ in $T$, and there is a *happens-before* relation for $(q, t)\}$
23:         if ($E \neq \varnothing$)
24:             choose any $q$ in $E$, add $tid(q)$ to $s_d.backtrack$;
25:         else
26:             $s_d.backtrack \leftarrow s_d.backtrack \cup \{tid(q) \mid q \in s_d.enabled\}$;
27:     }
28: }

```
lock(B)
if (c) {
   record-branch-begin();                              //added
   record-other-branches({(x,B)});                     //added
   lock(A)
   x++;
   y=z;
   unlock(A)
   record-branch-end();                                //added
}
else {
   record-branch-begin();                              //added
   record-other-branches({(x,A),(y,A),(z,A)});         //added
   lock(B)
   x++;
   p=q;
   unlock(B)
   record-branch-end();                                //added
}
unlock(B)
```

FIG. 5

1: Initially: $s_k.lksetSet(x) = \{\emptyset\}$ for all state $s_k$ and global variable $x$;

2: UpdateLocksets($s_{k-1}, t_k, s_k$) {
3:     if ($t_k$ is lock(f1))
4:         for each ($lkset \in s_{k-1}.lksetSet(x)$)
5:             $s_k.lksetSet(x) \leftarrow \{lkset \cup \{f1\}\} \cup s_k.lksetSet(x)$;
6:     else if ($t_k$ is unlock(f1))
7:         for each ($lkset \in s_{k-1}.lksetSet(x)$)
8:             $s_k.lksetSet(x) \leftarrow \{lkset \setminus \{f1\}\} \cup s_k.lksetSet(x)$;
9:     else if ($t_k$ is branch end) {
10:        let $t_j$ be the branch begin that matches $t_k$;
11:        let $L(x)$ be the set of locksets recorded for $x$ in the other branch;
12:        for each (global variable $x$)
13:            $s_k.lksetSet(x) \leftarrow L(x) \cup s_{k-1}.lksetSet(x)$;
14:     }
15: }

16: SubspaceRaceFree($s_1$) {
17:     let $s_1 \xrightarrow{t_1} s_1 \ldots \xrightarrow{t_n} s_n$ be the transition sequence such that $s_n.enabled = \emptyset$;
18:     $i \leftarrow 1$;
19:     while ($i < n$){
20:         $j \leftarrow i + 1$;
21:         while ($j < n$){
22:             for each (global variable $x$) {
23:                 let $set_1 \in s_i.lksetSet(x), set_2 \in s_j.lksetSet(x)$;
24:                 if ($\exists set_1, set_2$ such that $set_1 \cap set_2 = \emptyset$) return FALSE;
25:             }
26:             $j \leftarrow j + 1$;
27:         }
28:         $i \leftarrow i + 1$;
29:     }
30:     return TRUE;
31: }

FIG. 6

1: Initially: $S$ is empty; PDPSEARCH($S, s_0$)

2: PDPSEARCH($S, s$) {
3:    if ($s.enabled = \varnothing$) {
4:       for ($i = 0; i < S.size(); i++$) {
5:          let $s_b$ be the $i$-th element in $S$;
6:          for each ($t \in s_b.enabled$)
7:             PDPUPDATEBACKTRACKSETS($S, t$);
8:       }
9:    }
10:    else {
11:       if (DETECTRACE($s$)) exit ($S$);
12:       $S$.push($s$);
13:       let $\tau \in Tid$ such that $\exists t \in s.enabled : tid(t) = \tau$;
14:       $s.backtrack \leftarrow \{\tau\}$;
15:       $s.done \leftarrow \varnothing$;
16:       while ($\exists t \in s.backtrack \setminus s.done$) {
17:          $s.done \leftarrow s.done \cup \{t\}$;

18:          $s.backtrack \leftarrow s.backtrack \setminus \{t\}$;
19:          let $s' \in S$ such that $s \xrightarrow{t} s'$;
20:          UpdateLockSets($s, t, s'$);
21:          PDPSEARCH($S, s'$);
22:          $S$.pop($s$);
23:       }
24:    }
25: }

26: PDPUPDATEBACKTRACKSETS($S, t$) {
27:    let $T$ be the sequence of transitions associated with $S$;
28:    let $t_d$ be the latest transition in $T$, $s_d$ be the state in $S$ from which $t_d$ is executed, such that
        (1) $t_d$ is dependent and may be co-enabled with $t$, and
        (2) SubspaceRaceFree($s_d$) is FALSE;
29:    if ($t_d \neq$ null){
30:       let $E$ be $\{q \in s_d.enabled \mid tid(q) = tid(t)$, or $q$ in $T$, $q$ was after $t_d$ in $T$,
        and there is a *happens-before* relation for $(q, t)\}$ 31:       if ($E \neq \varnothing$)
32:          choose any $q$ in $E$, add $tid(q)$ to $s_d.backtrack$;
33:       else
34:          $s_d.backtrack \leftarrow s_d.backtrack \cup \{tid(q) \mid q \in s_d.enabled\}$;
35:    }
36: }

DYNAMIC MODEL CHECKING WITH PROPERTY DRIVEN PRUNING TO DETECT RACE CONDITIONS

RELATED APPLICATION INFORMATION

This application claims priority to provisional application Ser. No. 61/051,545 filed on May 8, 2008 incorporated herein by reference.

BACKGROUND

1. Technical Field

The present invention relates to computer program analysis tools and more particularly to a system and method for more efficiently analyzing computer programs by property driven pruning to reduce program checking overhead.

2. Description of the Related Art

Concurrent programs are notoriously hard to debug because they often include a large number of possible interleavings of thread executions. Concurrency bugs often arise in rare situations that are hard to anticipate and handle by standard testing techniques. One representative type of bugs in concurrent programs is a data race, which happens when multiple threads access a shared data variable simultaneously and at least one of the accesses is a write.

To completely verify a multi-threaded program for a given test input, one has to inspect all possible thread interleavings under that input. For deterministic programs, the only source of non-determinism comes from a thread scheduler of the operating system. In conventional testing environments, the user does not have full control over the scheduling of threads; running the same test multiple times does not necessarily translate into better coverage. Static analysis has been used for detecting data races in multi-threaded programs, both for a given test input and for all possible inputs. However, a race condition reported by static analysis may be bogus; even if it is real, there is often little information for the user to reproduce the failure.

Model checking has the advantage of exhaustive coverage which means all possible thread interleavings will be explored. However, model checkers require building finite-state or pushdown automata models of the software to be analyzed. The model checkers often do not perform well in the presence of heap allocated data structures.

Dynamic search can systematically explore the state space without explicitly storing the intermediate states. These techniques are often directly applied to handle software programs written in full-fledged programming languages such as C. For detecting data races, these methods are sound (no bogus races) due to their concrete execution of the program itself (as opposed to a model). Given a test input, an algorithm systematically executes the program under controlled thread schedules, to obtain concrete execution traces. If a data race is encountered during an execution, it is a real race condition (although it may be benign). Otherwise, the algorithm backtracks in the depth-first search order to a previous context switch and generates another execution trace. If all feasible thread interleavings have been explored without encountering any race condition, the program is race-free for the given input.

Although stateless dynamic model checking is sound (in that it does not report bogus bugs), the pruning of search space can be inefficient due to the lack of property specific backtracking. Note that the number of thread interleavings of a concurrent program can be astronomically large. Although partial order reduction can help remove redundant interleavings from the same equivalence class, provided that the representative interleaving has been explored, it is not a target driven pruning. Without a conservative approximation or warranty typical of static analysis, stateless model checking needs to enumerate the entire set of equivalence classes. However, as far as race detection is concerned, many equivalence classes themselves may be redundant and therefore should be pruned away.

FIG. 1 shows a motivating example. There are two concurrently running threads $T_1$ and $T_2$, both of which access the global variables x, y and z. All access to global variables are protected by the two locks $f_1$ and $f_2$. The data race occurs when the two threads access variable y simultaneously at lines $a_6$ and $b_{10}$. Since x=y=0 initially, the race condition may occur only when line $b_4$ is executed before any transitions of $T_1$. If (c=0) holds, $a_6$ and $b_{10}$ may be simultaneously reachable. In a stateless model checking run, the first execution trace, often arbitrarily chosen, may be $a_1, \ldots, a_{11}, b_1, \ldots, b_{11}$. Since $a_{10}$ and $b_3$ have a read-write conflict on variable a, according to dynamic partial order reduction (DPOR) algorithms, a backtracking point is added immediately before line $a_9$ to make sure that the alternative trace $a_1, \ldots, a_8, b_1, b_2, b_3, \ldots$ is explored in future search. This is reasonable, and is true for any partial order reduction method, since the above two executions are not in the same equivalence class (in Mazurkiewicz's trace theory, as is known).

However, it is clear that backtracking to $a_9$ and then searching the subspace is futile since line $a_6$ can never be reached simultaneously with $b_{10}$ in this set of alternative execution traces. This can be revealed by a simple lockset analysis, together with the fact that all the other shared variable accesses are protected by some common locks. In such cases, ideally we would like to have a property specific search space pruning to skip $a_9$ and backtrack directly to $a_2$.

SUMMARY

A new dynamic model checking system and method are provided for detecting data races in multi-threaded programs. A lockset based static analysis of existing execution traces is employed to help pruning future search subspace to be explored by a dynamic search. In particular, a stateless search is used to systematically execute the program and inspect individual traces in a depth-first search order. If the (conservative) lockset analysis shows that a search subspace starting from a certain state is race-free, the search subspace can be pruned away by skipping the addition of backtracking points at this particular state. The new race detection method is proven to be both sound and complete (as precise as the dynamic partial order reduction), as well as being more efficient in practice, allowing the present technique to scale much better to real-world multi-threaded programs.

The use of a trace-based predictive analysis to prune the search space in the context of dynamic model checking is provided. We apply a lightweight lockset analysis on various suffixes of the current execution trace, with the aim of predicting potential data races in the corresponding search subspaces. The analysis needs to decide whether a search subspace related to the current execution is race-free, not merely checking the observed execution trace itself. The analysis is also different from static lockset analysis performed a priori on a whole program, since we rely on the information derived from dynamic execution to be more precise. The result of directly applying standard lockset methods on the execution trace cannot be used to prune the search space in the way we intend to; otherwise, the overall method would lose completeness (miss some race conditions). For example, in FIG. 1, all shared variables in $a_1, \ldots, a_{11}, b_1, \ldots, b_8, b_9, b_{11}$ are protected by some common locks (and hence the observed trace race-free), but we cannot prune away all the backtracking points along this trace. Note that the race condition comes from a not-yet-executed branch ($a_{10}$), which is considered in the present analysis.

If a search subspace is race-free, we can safely prune it away during dynamic model checking, e.g., skip adding the corresponding backtracking points in the dynamic search. if there is a potential race condition, we also analyze the cause to compute a proper back tracking point. Our backtracking point selection has additional pruning capability based on the trace-based static analysis.

In DPOR, if two transitions $t_1$, $t_2$ from different threads are conflicting (access a shared variable and one of them is a write), and $t_1$ happened before $t_2$, then a backtracking point is added at the state immediately before $t_1$. In our case, we also check whether flipping the execution order of $t_1$, $t_2$ may affect the reachability of the race condition. If the answer is no, we can safely skip adding the backtracking point for $(t_1, t_2)$. One advantage of this predictive pruning is that in case there is no data race, we can prove race-free much faster.

The present embodiments include a predictive trace-based analysis for detecting potential races, and a backtracking method in a dynamic search based on property-driven pruning. The method for checking race-free subspace is different from the techniques called predictive testing, which use variants of happens-before partial order derived from an observed execution trace to predict bugs in alternative feasible interleaving of the current execution trace. These techniques in general are sound (no bogus race) but not complete (may miss races). Therefore, they cannot be used directly in our framework for pruning; the dynamic model checking for search space pruning should be complete.

A system and method for dynamic model checking for concurrent systems includes performing controlled concurrent executions of a multi-threaded program where the controlled executions are driven by a property. A search space associated with the executions is dynamically pruning when the property holds to reduce resource use during program analysis.

A system and method for dynamic data race detection for concurrent systems includes computing lockset information using a processor for different components of a concurrent system. A controlled execution of the system is performed where the controlled execution explores different interleavings of the concurrent components. The lockset information is used during the controlled execution to check whether a search subspace associated with a state in the execution is free of data races. A race-free search subspace is dynamically pruned to reduce resource usage.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is an illustrative example program employed to shown some of the benefits of the present principles over the prior art;

FIG. 3 is a pseudo-code listing for a program for performing a stateless model checking search using partial order reduction in accordance with one embodiment;

FIG. 4 is a pseudo-code listing for a program which illustratively includes instrumentation for branching statements in accordance with an illustrative example;

FIG. 5 is a pseudo-code listing for a program for checking whether search subspaces are race free in accordance with one illustrative embodiment;

FIG. 6 is a pseudo-code listing for a program for predictive data race detection in accordance with one illustrative embodiment.

DETAILED DESCRIPTION OF PREFERRED EMBODIMENTS

Dynamic model checking can directly check correctness properties in concurrent programs written in full-fledged programming languages, by systematically executing a program in its target environment. However, explicitly enumerating the individual execution traces is expensive, especially for exploring all possible interleavings (schedules) of multiple threads or processes.

The present principles rely on dynamic model checking (in particular, its concrete execution of the program in the target environment) to ensure that no bogus bug is reported, while using a conservative lock-set analysis on the existing execution trace to help prune the future search space. Embodiments include using a lockset analysis to check the possibility of getting a race condition in a certain search subspace during dynamic model checking. If the conservative lock-set analysis indicates that there is no way of getting a race condition in that search subspace, then we can safely prune away the subspace in dynamic model checking. The present data race detection methods are faster in run time and scale better to large systems. Applying these systems/methods in development of multithreaded applications can improve the programmer's productivity and the software product quality, and can reduce development costs by finding bugs early and cheaply.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device). The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 2:
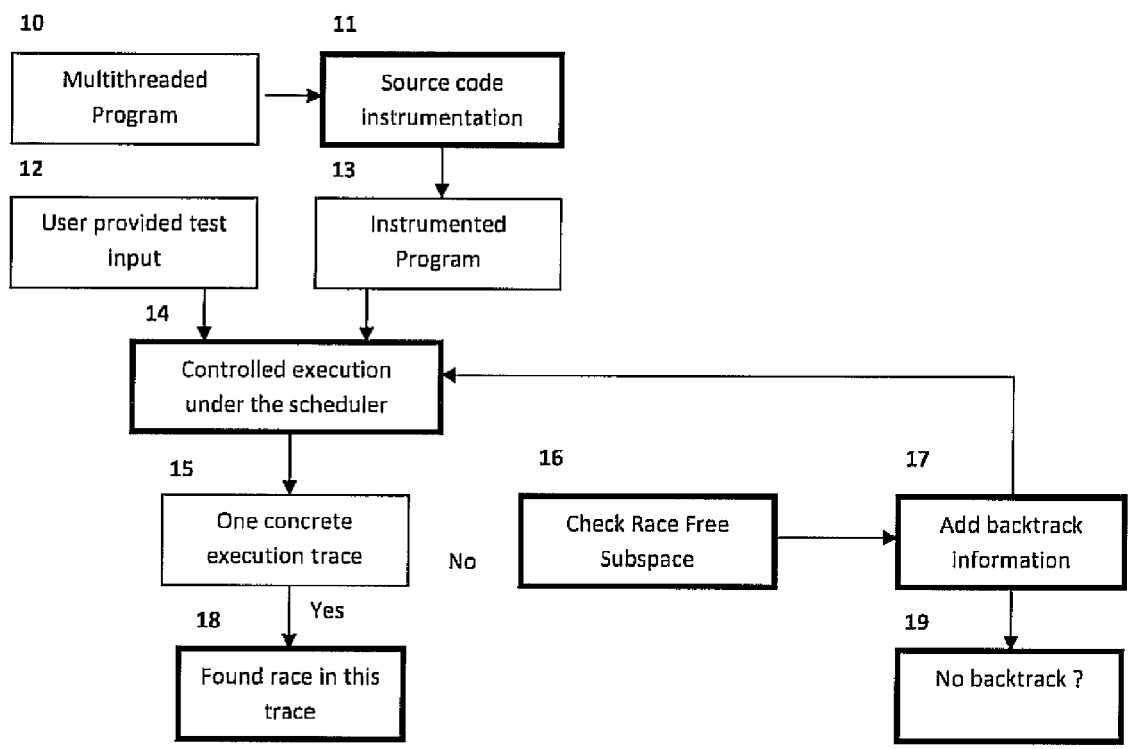
FIG. 2 is a block/flow diagram of a system/method for dynamic model checking in accordance with the present principles.

Referring now to the drawings in which like numerals represent the same or similar elements and initially to FIG. 2, a system/method for analyzing a program is illustratively depicted in accordance with one illustrative embodiment. In block 10, given a multithreaded program and user provided test input 12, source code instrumentation 11 is employed to produce an instrumented program 13. The program is stored in memory media. A controlled execution is performed based upon the test input 12 and the instrumented program 13 using a thread scheduler 14 (e.g., a processor). This produces a concrete execution trace in block 15.

In block 15, we first analyze this particular trace, if a bug/race is found, then the procedure terminates in block 18. Otherwise, a check is performed as to whether a related search subspace is race-free in block 16.

Based on the analysis results of block 16, we add proper backtracking information in block 17. It no backtracking point is added for the entire execution trace, then the program is proved to be race-free in block 19, and the procedure terminates. Otherwise, the procedure backtracks and then goes back to block 14 to try again. In block 16, a new lockset analysis procedure is performed to (conservatively) check whether a search subspace associated with the current execution trace is "race-free". In block 17, a new method for updating the backtrack sets during dynamic model checking is performed, with the aim of pruning the search subspace using the information gathered by block 16. The program is analyzed for data races or other program bugs/errors. If errors are found (block 18), the program is modified by a user to fix any errors.

The concepts described with respect to FIG. 2 will now be described in greater detail. FIG. 1 considers a multi-threaded program (block 10) with a fixed number of threads as a state transition system. Threads may access local variables in their own stack, as well as global variables in the shared heap. The operations on global objects are called visible operations, while those on thread local variables are invisible operations. Synchronization primitives, such as locks and condition variables, are regarded as global objects.

We use Global to denote the set of states of all global objects, Local to denote the set of local states of a thread. PC is the set of values of the program counter of a thread. Tid={1, . . . ,n} is the finite set of thread indices. The entire system state(s), the program counters of the threads (PCs), and the local states of threads (Locals) are defined as follows:
S ⊂ Global×Locals×PCs
$\overline{PC}$s=Tid→PC
Locals=Tid→Local A transition t:S→S advances the program from one state to a subsequent state. Each transition t includes one visible operation, followed by a finite sequence of invisible operations of the same thread up to (but excluding) the next visible operation. Let T denote the set of all transitions of a program. A transition t∈T is enabled in a state s if t(s) is defined. We use $$s \xrightarrow{t} s'$$

to denote that t is enabled in s and s'=t(s) is the successor state. Two transitions $t_1, t_2$ may be co-enabled if there exists a state in which both $t_1$ and $t_2$ are enabled. We use tid(t)∈Tid to denote the thread index of the transition t.

A state transition graph is denoted M=(S,$s_0$,Γ), where $s_0$ is the initial state and Γ ⊂ S×S is the transition relation:

$$(s, s') \in \Gamma \text{ iff } \exists t \in T : s \xrightarrow{t} s'.$$

An execution trace is a finite sequence of states $s_0, \ldots, s_n$, for which ∃$t_i$ such that $$s_{i-1} \xrightarrow{t_i} s_i$$

for all 1≤i≤n. It is possible for a transition t to appear in the execution trace multiple times. Two transitions are independent if they can neither disable nor enable each other, and swapping their order of execution does not change the combined effect.

Definition 1: R ⊂ T×T is an independence relation iif for each ⟨$t_1,t_2$⟩∈R the following two properties hold for all s∈S:
1. if $t_1$ is enabled in s and $$s \xrightarrow{t_1} s',$$

then $t_2$ is enabled in S'; and
2. if $t_1, t_2$ are enabled in s, there is a unique state s' such that s ⇒s' and s ⇒s'.

Two execution traces are equivalent if they can be transformed into each other by repeatedly swapping adjacent independent transitions. Note that when two adjacent transitions are independent, swapping them does not change the overall behavior of the execution. In explicit-state model checking, partial order reduction techniques have been be used to exploit the redundancy within equivalence classes to prune the search space. In particular, model checking has to consider only one representative interleaving from each equivalence class.

Dynamic Partial Order Reduction: Systematic state space exploration can be performed in a stateless fashion, by dynamically executing the program in a depth-first search order. Instead of enumerating reachable states of the model, as in classic model checkers, dynamic model checking focuses on exhaustively exploring the feasible executions. This is made possible by controlling and observing the execution of visible operations of all threads. In particular, the entire program is executed under the control of a special master thread called a scheduler (block 14), which gives permission to, and observes the results of all visible operations. Since the scheduler 14 has full control of every context switch, systematic exploration becomes possible. In this context, backtracking or the roll-back of a partially executed sequence is implemented by re-starting the program afresh under a different thread schedule.

In a dynamic search, as shown in pseudo-code in FIG. 3, the scheduler (14) maintains a search stack S of global states. Each state s in the stack is associated with a set s.enabled of enabled transitions, a set s.done of already executed transitions, and a backtracking set, which is a subset of enabled transitions in s (their thread indices) that need to be explored from s. DporUpdateBacktrackSets (S,t) is used to prune the search space using partial order reduction. A plain depth-first search (DFS) without partial order reduction would correspond to an implementation of this function in which $t_d$ is defined (alternatively) as the last transition in T such that tid($t_d$)≠tid(t), as opposed to line 19, and all transitions in $s_d$.enabled are added to $s_d$.backtrack.

The procedure DporUpdateBackTrackSets (S,t) in lines 17-28 implements the DPOR algorithm; it updates the backtrack set only for the last transition $t_d$ in T such that $t_d$ is dependent and may be co-enabled with t. The backtrack set $s_d$.backtrack is a subset of the enabled transitions. In line 22, the set E includes transitions q in T such that (q,t) has a happens-before relation. Intuitively, q happens-before t means that flipping the execution order of q and t may lead to interleavings in a different equivalence class.

Data race detection is essentially checking the simultaneous reachability of two conflicting transitions (access the same global variable and one is a write). The procedure DETECTRACE (s) checks in state s whether two transitions $t_1, t_2$ are conflicting on a shared variable, and both are enabled in s. If the answer is yes, it reports a data race; in this case, the states in the stack S serve as a counterexample. The advantage of this race detection procedure is that it does not report bogus races (although the race itself may be benign). If the top-level DPORSEARCH $(S,s_0)$ completes without finding any race, then the program is proved to be race-free under the given input. Dynamic partial order reduction is sound and complete for detecting data races (as well as deadlocks and assertion violations).

Race Free Search Subspace: Given a concrete execution trace (block 15) stored in the stack S and a state $s_1$ in S, we use a lightweight static analysis to determine whether the entire search subspace starting from $s_1$ is race free. The search subspace is race-free means that no race exists in any execution trace that shares the same transition prefix up to $s_1$. During dynamic model checking in block 16, instead of adding backtracking points for each pair of conflicting transitions as in DPOR, we add backtrack sets only if that particular backtracking may lead to a violation.

Set of Locksets: Given a finite transition sequence $t_1, \ldots, t_n$, we map it back to the individual threads as a set of thread-local transition sequences. As an example, the execution trace $a_1, \ldots, a_{11}, b_1, \ldots, b_9, b_{11}$ is mapped into two thread-local sequences $a_1, \ldots, a_{11}$ and $b_1, \ldots, b_9, b_{11}$, where $b_9$ is a special statement assume c!=0. In the subsequent analysis, we will assume that transitions of the two sequences can be interleaved in arbitrary orders, subject to the thread local constraints.

Next, we partition each thread-local sequence into a set of smaller segments. For each segment $seg_i$, we find the set of global variables that may be accessed within $seg_i$ and, for each access, the corresponding lockset. If a variable x is accessed multiple times in $seg_i$ or in more than one branch of $seg_i$, then x may correspond to a set of locksets (one for each access).

Definition 2: For each segment $seg_i$ and each global variable x, we maintain a set $1ksetSet(seg_i,x)$, which includes all the possible locksets that can be associated with accesses of x in $seg_i$.

Precisely computing $1ksetSet(seg_i,x)$ needs the inspection of all the feasible execution traces in which variable x is accessed in the sequence ($seg_1$). This is not desired. Instead, we apply a lightweight static analysis to compute an approximation of $1ksetSet(seg_i,x)$. For the purpose of race detection, it suffices to consider a set of locksets in which each lockset may be an under-approximation of the actual lockset in the extreme case of under-approximation, $1ksetSet(seg_i,x)=0$ is a set of empty set, which means that variable x is not protected by any lock in $seg_i$. If another thread also accesses x in the sequence $seg_j$, then the present method (conservatively) reports a potential race condition.

By assuming that one can arbitrarily permute the transitions from different segments, subject only to their thread local order, we check whether it is possible to en-counter a potential race condition. That is, for each pair $(seg_i, seg_j)$ such that $tid(seg_i) \neq tid(seg_j)$ and each variable x, we check whether $\exists 1ksetSet(seg_i,x)$, $1kset_2 \in 1ksetSet(seg_j,x)$ such that $1kset_1 \cap 1kset_2 = 0$. An empty set represents a potential race check whether $\exists 1ksetSet(seg_i,x)$, $1kset_2 \in 1ksetSet(seg_j,x)$ such that $1kset_1 \cap 1kset_2 = 0$. An empty set represents a potential race condition –x is not protected by a common lock. The result of this analysis can be refined by further partitioning $seg_i, seg_j$ into smaller fragments.

In general, this trace-based lockset analysis is expected to provide some pruning capability in dynamic model checking. For example, in FIG. 1, we can partition the sequences $a_1, \ldots, a_{11}$ and $b_1, \ldots, b_{11}$ into $seg_1 = a_1, \ldots, a_8$, $seg_2 = a_9, \ldots, a_{11}$, $seg_3 = b_1, \ldots, b_7$, $seg_4 = b_8, \ldots, b_{11}$.

Note that any execution trace starting with the prefix $a_1, \ldots, a_8$ is race-free, because even if $seg_2$ can be interleaved arbitrarily with $seg_3$, $seg_4$, they share only one common variable z, which is protected by lock f2 in both threads. Therefore, the corresponding search subspace after $a_8$ is race-free, and there is no need to add a backtracking point immediately before $a_9$ during dynamic model checking (block 16, FIG. 2).

By the same lockset analysis, we know that the entire search space starting at the initial state is not race-free. Variable y is accessed by both $seg_1$ and $seg_4$, and is protected by different locks. However, such analysis demands us to analyze not only the transitions activated in the current execution, but also transitions in branches that are not executed (e.g., $b_{10}$).

The Other Branches: A sequence $seg_i$ of thread-local transitions may include branching statements, e.g., in the form of if (c)-else. When the condition (c) holds, the then-branch is executed (the branch taken is denoted by assume (c) in the execution trace). The execution trace provides no information about the else-branch as to which global variable is accessed and which locks are held. Notice that the set $1ksetSet(seg_1, x)$ of locksets includes all the locksets of x that may be accessed in some interleaving executions of the transition sequence $seg_i$. In other words, we need a may-set of global variables accessed in $seg_i$, and their corresponding must-set of locks. The set 1ksetSet cannot be computed by analyzing the current transition sequence alone. We need this information for all branches within $seg_i$, including the not-yet-executed ones.

Our solution is to augment all branching statements, through source code instrumentation, so that the static lockset information of all branches (computed a priori) is readily available to our analysis during runtime. To this end, for each branch, we insert a special function called record-other-branches ( ) to record the set of global variables accessed in the other branches, together with the locksets protecting these accesses. Note that neither set has to be accurate; it suffices to use an over-approximated set of global variables and, for each global variable, a set of under-approximated locksets.

The instrumentation (block 13, FIG. 2) of branching statements is illustrated on a simple example in FIG. 4. In this example, functions record-branch-begin and record-branch-end are added to each branch to notify the scheduler (14) about the start and end of the branch, respectively. The function record-other-branches is also added to provide information to the scheduler about the set of global variables and their corresponding lock-sets. This information is computed a priori by a whole program static analysis (to be explained below). When if (c)-branch is executed, the scheduler 14 knows that the else-branch may access variable x and the access is always protected by lock B. Similarly, when the else-branch is executed, the scheduler knows that if (c)-branch may access x,y,z and the accesses are always protected by lock A.

The present instrumentation also handles loops and the corresponding statements such as break and continue in a similar manner.

Checking Race Free Subspace: The pseudo code for updating the set of locksets at every execution step is given as UpdateLocksets in FIG. 5. The pseudo code for checking race-free subspace at the very end of an execution is given as SubspaceRaceFree in FIG. 5. Referring to FIG. 5, in each state $s_k$ in the stack, there is a set $s_k.\mathrm{lksetSet}(x)$ for every global variable of the program, which is initialized to be $\{0\}$.

UpdateLocksets $(s_k-1, t_k, s_k)$ computes the set of locksets for state $s_k$ based on the information in $s_k-1$ and the current transition $t_k$. Recall that $$s_{k-1} \xrightarrow{t_k} s_k.$$

In order to update the locksets, we need to track the lock/unlock routines when they are executed in $t_k$. Note that we have added two special types of transitions branch begin and branch end to each branch. The procedure also tracks these special transitions to identify the scope of a branch during dynamic search. The set L(x) is provided by the instrumented function record-other-branches.

SubspaceRaceFree(s)checks whether the search subspace, starting from $s_1$ (with the same execution prefix), may include a race condition. This check is performed by intersecting pair-wise locksets of the same global variable but from different threads. If there exists an empty intersection, then it returns FALSE.

Although the standard notion of locksets is used in our analysis, the method of FIG. 5 for checking race-free search subspace is different from existing lockset analysis. First, we consider not only the current execution but also the not-yet-activated branches. Second, we update the set of locksets in a way different from the existing algorithms. To this end, for each transition, we maintain a set of locksets. At the merge point right after the if-else branches, we do not merge two locksets from different branches into a single must-lockset; instead, we maintain locksets from different branches as separate entities in a set (and propagate them to subsequent transitions).

Existing lockset based algorithms rely on the principle of locking discipline, by checking whether shared variables are consistently protected by an appropriate set of locks. Most dynamic lockset based methods follow the known "Eraser" method. For each shared variable, it maintains a candidate set, consisting of locks that have up until that point been used to protect that variable. This candidate set initially contains every possible lock in the system; every time a thread accesses the variable, the conventional algorithm takes the intersection of all locks held by the thread at that location and the variable's candidate set. As soon as the candidate set becomes empty, the conventional algorithm signals a possible race condition, since none of the previously used locks is protecting the variable at the current location.

The present method for checking race-free subspace is also different from static lockset analysis techniques that are performed a priori on the whole program. Although these techniques can be used in conjunction with partial order reduction, they do not utilize the more precise information about the program derived from concrete executions; such dynamically derived information (e.g., of locksets, pointers, and other heap allocated objects) can be more accurate than the result of a static analysis. For example, when global variables are accessed through pointers, the actual set of global variables during the protect global variable access in the execution may also be significantly smaller.

Referring to FIG. 6, an overall method for data race detection is represented in pseudo-code. We use the lockset analysis to prune the search space conservatively, and rely on the concrete execution in dynamic model checking to ensure that no bogus race is reported. A procedure PDPSEARCH (stands for Property-Driven Pruning) takes as inputs the search stack S and the current state s. Initially, S is empty and $s=s_0$ is the unique initial state. Each time PREDICATESEARCH is called on a new state s, lines 10-24 will be executed. As described previously, procedure DETECTRACE(s) is used to detect race conditions in s during runtime. If at any time, DETECTRACE(s) reports a race condition, the entire procedure terminates (block 18 of FIG. 2) with a counterexample in S. Once a concrete execution of the program finishes (in block 15 of FIG. 2), as indicated at line 3 by s.enabled=0, we start adding backtracking points for the entire execution trace (in block 16 of FIG. 2). When going through lines 3-9, we have already completed the execution (assume the program is terminating). This makes our backtracking different from the one in DPOR, which does not have information about the entire trace. (In DPOR, backtrack sets are added in the the one in DPOR, which does not have information about the entire trace. (In DPOR, backtrack sets are added in the pre-order of DFS; in contrast, we add backtrack sets after the entire execution completes).

In the procedure PDPUPDATABACKTRACKSETS (S, t), for each state $t_d$ that is dependent and may be co-enabled with t, we also check whether the search subspace starting from $s_d$ (the state from which $t_d$ is executed in T) is race-free (in block 17 of FIG. 2). If the answer is yes, we can safely skip adding the backtracking point at $s_d$. Otherwise, the algorithm proceeds in the same depth-first search fashion as in DPOR.

Running Example: We show how the overall method works on the example in FIG. 1. Assume that the first execution trace is:

$$s_0 \xrightarrow{a_1} s_1 \xrightarrow{a_2} \ldots \xrightarrow{a_6} s_6 \xrightarrow{a_{10}} s_{10} \ldots s_{13} \xrightarrow{b_3}$$
$$s_{14} \xrightarrow{b_4} s_{15} \ldots \xrightarrow{b_9:(c==0)} s_{20} \xrightarrow{b_{11}} s_{21},$$

which is produced by recursively going through lines 11-21 of FIG. 6. Since $s_{21}$.enabled=0, the last call to PDPSEARCH $(S, s_{21})$ goes through lines 3-9. For every state $s_b$ in the stack S, we try to update the backtrack sets. When adding backtrack sets, we go through the stack in the following order: $s_0, s_1, \ldots, s_{21}$.

For $s_0, \ldots, s_{10}$, there is no need to add a backtracking point, because (per line 28) there is no transition $t_d$ from a thread different from tid(t).

For $s_{13}$, the enabled transition $$s_{13} \xrightarrow{b_3:z++} s_{14}$$

is dependent and may be co-enabled with $t_d = a_{10}:z++$. (For simplicity in this explanation, we assume lock-atomicity by grouping each global variable accesses with its lock/unlock routines—each block is regarded as atomic; transitions can be handled in a similar way.) However, since the search subspace from $s_9$ is race-free, we do not add backtracking points.

For $s_{14}$, the enabled transition

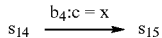

is dependent and may be co-enabled with td=$a_2$:x++. The search subspace from $s_0$ has a potential race condition (between $a_6$ and $b_{10}$). We add a backtracking point $s_0$.backtrach=$\cup\{2\}$, which means that, in a future execution, thread $T_2$ should be scheduled at state $s_0$.

After that, the recursive procedure PDPSEARCH(S,$s_i$) keeps returning for all i, such that $0<i\leq 21$; this is indicated by lines 21-22. Since $s_0$.backtrack=$\{2\}$, we will go through lines 17-23 of PDPSEARCH(S,$s_0$). After backtracking, the next execution sequence starts from s' where

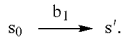

The correctness of the overall method can be summarized as follows: First, any race condition reported by PDPSEARCH is guaranteed to be a real race condition; the sequence of states in S represents a concrete counterexample. Second, if PDPSEARCH returns without finding any race condition, the program is guaranteed to be race-free under the given input. Finally, for terminating programs, PDPSEARCH always returns a conclusive result (either race-free or a concrete race).

The present principles provide as precise as a result or better as DPOR. Many of the real world multithreaded programs are terminating programs. If a program is nonterminating, PDPSEARCH can be used as a bounded analysis tool—to detect bugs up to a predetermined number of execution steps.

The soundness (that no bogus race is reported) of the method is ensured by the fact that it is concretely executing the actual program within its target environment as opposed to analyzing a model. The completeness (for terminating programs) can be established by the following arguments: (1) the baseline DPOR has been proved to be sound and complete for detecting race conditions (as well as deadlocks and assertion violations); and (2) our lockset analysis is conservative in terms of anticipating race conditions. The procedure for checking race-free subspace returns 'yes' only if no race condition can be reached in any execution trace that is a permutation of the current trace.

Instrumentation (block 13, FIG. 2): We have implemented the present principles on top of an Inspect tool, which implements the baseline dynamic POR method together with the capability of detecting data races. The instrumentation in Inspect includes the following steps: (1) for each global variable access, insert a request to the scheduler asking for permission before the operation is executed; (2) for each thread library routine, add a wrapper function within which a request is sent to the scheduler; (3) for each thread function, add a thread start at the entry point and a thread end at the exit point. Furthermore, we add, for each branching statement, branch begin and branch end to signal the start and end of the branch, respectively. To record the effect of executing the other branch, we also add a function record-other-branches to both branches of the if-else statements.

To control every visible operation of the program, during the source code instrumentation (block 11, FIG. 2), we need to identify a set of global variables. In addition, we need to add wrappers to all the thread library routines since they are manipulating the special type of global variables: synchronization primitives. The global variable identification needs a conservative static analysis of the multithreaded program, e.g., pointer and may-escape analysis. Since lock pointers and other heap allocated data structures may be involved, a static analysis performed a priori may not always be effective. Since the may-escape analysis is an over-approximation, the instrumentation is safe for intercepting all visible operations. This ensures that dynamic model checking does not miss any bug due to missing identification of a shared variable.

If a whole program static analysis is ineffective (or not possible due to missing source code), we will have to face these problems during the instrumentation. The instrumentation of the branching statements needs, at compile time, the set of global variables accessed in each branch and the corresponding locksets. Fortunately, checking race-free subspace does not require precise information about the accessed global variables and locksets. In the extreme case, we can choose to approximate the information passed to record-other-branches:—If a branch may hold a lockset that cannot be accurately predicted; or—if a branch may affect the lockset of a subsequent statement, we can pass to record-other-branches the set of all global variables in the system, and associate each variable with an empty lockset. This would effectively force the present methods to schedule a backtrack to go through the other branches in some future executions.

A new data race detection method combines the power of dynamic model checking with property driven pruning based on lockset analysis. The method systematically explores concrete thread interleavings of a program, and at the same time prunes the search state space with a conservative lockset analysis. It is both sound and complete; at the same time, it is significantly more efficient in practice, allowing the technique to scale much better to real-world applications. The present principles can be extended to check other types of properties. Since race detection is essentially a problem of simultaneous reachability of two transitions, the techniques developed here should be readily applicable to checking deadlocks and assertion violations.

Figure 7:
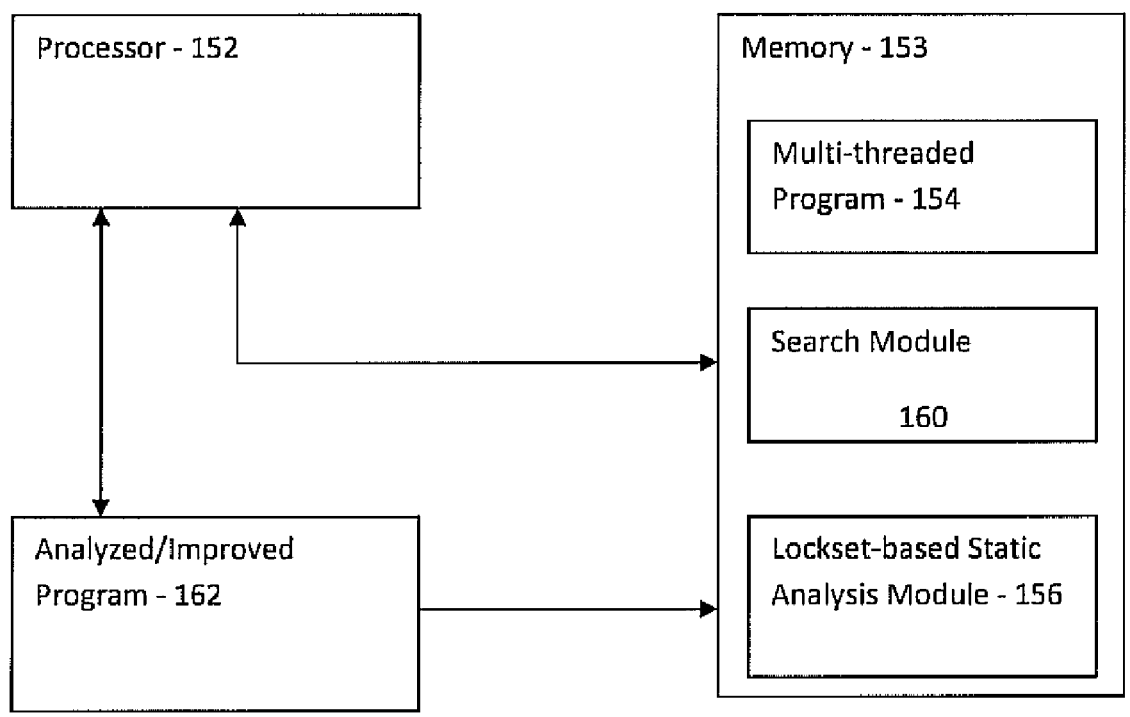
FIG. 7 is a block diagram showing a system for dynamic model checking in accordance with the present principles.

Referring to FIG. 7, a dynamic model checking system 150 is illustratively shown. System 150 includes one or more processors 152, which interact with and employ memory 154. Memory 154 may include any media for storing code and/or data. Processor 152 is configured to receive user provided test inputs, instrumented programs to perform its analysis. Processor 152 is configured to perform a stateless search on a multi-threaded program 156 to systematically execute the program and inspect individual execution traces in a depth-first search order. A search module 160 is employed to perform the stateless and/or the dynamic searching. The processor 152 is further configured to perform a lockset based static analysis using a lock set analysis module 158.

The lockset based static analysis of the execution traces prune a future search subspace to be explored by a dynamic search if the lockset based static analysis shows that the search subspace starting from a certain state is race-free. The lockset based static analysis may include locksets computed for individual segments of thread transitions. The locksets of individual threads may be employed to check whether the search subspace associated with an execution is race-free. The processor 152 performs the operation of a scheduler 14 as described above with reference to FIG. 2.

In one embodiment, the search subspace is pruned away by skipping an addition of backtracking points at a particular state. The processor 152 may selectively add backtrack points in the program based on a check for a race-free search subspace. The processor 152 can model branching statements that do not appear executed in a current execution trace. The processor 152 may output an analyzed program 162. The program 162 may be verified to include no errors, data races, etc., be modified to improve the program and/or be rejected for further analysis, etc.

Having described preferred embodiments of a system and method for dynamic model checking with property driven pruning to detect race conditions (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for dynamic data race detection for concurrent systems, comprising:
   computing lockset information using a processor for different components of a concurrent system;
   performing a controlled execution of the system where the controlled execution explores different interleavings of the concurrent components;
   utilizing the lockset information during the controlled execution to check whether a search subspace associated with a state in the execution is free of data races; and
   dynamically pruning a race-free search subspace to reduce resource usage; where for each pair of segments ($seg_i$, $seg_j$) with $tid(seg_i) \neq tid(seg_j)$ and each variable x, checking whether $\exists lkset \in lksetSet(seg_i, x)$, $lkset_2 \in lksetSet(seg_j, x)$ such that $lkset_1 \cap lkset_2 = 0$, where set $lksetSet(seg_i, x)$ includes locksets associated with accesses of x in $seg_i$ and $tid(t)$ denotes a thread index of transition t.

2. The method as recited in claim 1, wherein computing lockset information includes analyzing the system components statically to identify global objects and to compute locksets in every branching segment of the components.

3. The method as recited in claim 2, wherein the computed lockset information is employed to instrument the concurrent system.

4. The method as recited in claim 1, wherein performing controlled executions includes exploring the concurrent schedules systematically using a depth-first search and backtracking.

5. The method as recited in claim 4, wherein dynamic partial order reduction is used to insert backtracking points.

6. The method as recited in claim 1, wherein the check of whether a search subspace is race-free includes utilizing statically computed lockset information to compute the locksets for individual transactions in the controlled execution.

7. The method as recited in claim 6, further comprising computing precise locksets for branching statements that appear in a current trace of the controlled execution.

8. The method as recited in claim 6, further comprising computing conservative locksets for branching statements that do not appear in a current trace of the controlled execution.

9. The method as recited in claim 1, wherein dynamically pruning includes:
   selectively adding backtrack points when performing the controlled execution based on whether the search subspace is race-free.

10. A method for dynamic data race detection for multi-threaded programs, comprising:
    computing lockset information by a processor for individual branching statements of a multithreaded program;
    performing controlled executions of the program where the controlled executions explore different thread interleavings;
    utilizing the lockset information during a controlled execution to check whether a search subspace associated with a state in the execution is free of data races; and
    dynamically pruning the race-free search subspace to reduce resource usage; where for each pair of segments ($seg_i$, $seg_j$) with $tid(seg_i) \neq tid(seg_j)$ and each variable x, checking whether $\in lksetSet(seg_i, x)$, $lkset_2 \in lksetSet(seg_j, x)$ such that $lkset_1 \cap lkset_2 = 0$, where set $lksetSet(seg_i, x)$ includes locksets associated with accesses of x in $seg_i$ and $tid(t)$ denotes a thread index of transition t; and
    modifying program code of the multithreaded program to eliminate data races.

11. The method as recited in claim 10, wherein computing lockset information includes analyzing the program threads statically to identify global objects and to compute locksets in every branching statement of the threads.

12. The method as recited in claim 10, wherein the computed lockset information is employed to instrument the multi-threaded program.

13. The method as recited in claim 10, wherein performing controlled executions includes exploring the concurrent schedules systematically using a depth-first search and backtracking.

14. The method as recited in claim 10, wherein dynamic partial order reduction is used to insert backtracking points.

15. The method as recited in claim 10, wherein the check of whether a search subspace is race-free includes utilizing statically computed lockset information to compute the locksets for individual transactions in the controlled execution.

16. The method as recited in claim 15, further comprising computing precise locksets for branching statements that appear in a current execution trace of the controlled execution.

17. The method as recited in claim 15, further comprising computing conservative locksets for branching statements that do not appear in a current execution trace of the controlled execution.

18. The method as recited in claim 10, wherein dynamically pruning includes:
    selectively adding backtrack points when performing the controlled execution based on whether the search subspace is race-free.

19. A dynamic model checking system, comprising:
    a processor configured to perform a stateless search on a multi-threaded program to systematically execute the program and inspect individual execution traces in a depth-first search order;
    the processor is further configured to perform a lockset based static analysis of the execution traces to prune a future search subspace to be explored by a dynamic search if the lockset based static analysis shows that the search subspace starting from a certain state is race-free;

wherein, for each pair of segments ($seg_i$, $seg_j$) with $tid(seg_i) \neq tid(seg_j)$ and each variable x, checking whether $\exists lkset_1 \in lksetSet(seg_i, x)$, $lkset_2 \in lksetSet(seg_j, x)$ such that $lkset_1 \cap lkset_2 = 0$, where set $lksetSet(seg_i, x)$ includes locksets associated with accesses of x in $seg_i$ and tid(t) denotes a thread index of transition t.

20. The system as recited in claim 19, wherein the search subspace is pruned away by skipping an addition of a backtracking point at a particular state.

21. The system as recited in claim 19, wherein the lockset based static analysis includes locksets computed for individual transactions of thread transitions.

22. The system as recited in claim 21, wherein the locksets of individual threads are employed to check whether the search subspace associated with a state in the execution is race-free.

23. The system as recited in claim 19, wherein the processor selectively adds backtrack points based on a check for a race-free search subspace.

24. The system as recited in claim 19, wherein the processor models branching statements that do not appear in a current execution trace.

* * * * *